United States Patent
Mao et al.

(10) Patent No.: US 11,061,406 B2
(45) Date of Patent: Jul. 13, 2021

(54) OBJECT ACTION CLASSIFICATION FOR AUTONOMOUS VEHICLES

(71) Applicant: Waymo LLC, Mountain View, CA (US)

(72) Inventors: Junhua Mao, Palo Alto, CA (US); Congcong Li, Cupertino, CA (US); Alper Ayvaci, Santa Clara, CA (US); Chen Sun, San Francisco, CA (US); Kevin Murphy, Palo Alto, CA (US); Ruichi Yu, College Park, MD (US)

(73) Assignee: Waymo LLC, Mountain View, CA (US)

(*) Notice: Subject to any disclaimer, the term of this patent is extended or adjusted under 35 U.S.C. 154(b) by 212 days.

(21) Appl. No.: 16/167,007

(22) Filed: Oct. 22, 2018

(65) Prior Publication Data

US 2020/0125112 A1   Apr. 23, 2020

(51) Int. Cl.
| | |
|---|---|
| *G05D 1/02* | (2020.01) |
| *B60W 30/095* | (2012.01) |
| *G01S 17/93* | (2020.01) |
| *G05D 1/00* | (2006.01) |
| *G06K 9/00* | (2006.01) |
| *G06K 9/62* | (2006.01) |
| *G01S 17/931* | (2020.01) |

(52) U.S. Cl.
CPC ....... *G05D 1/0248* (2013.01); *B60W 30/0956* (2013.01); *G01S 17/931* (2020.01);
(Continued)

(58) Field of Classification Search
CPC .............. G05D 1/0248; G05D 1/0088; G05D 2201/0213; G01S 17/931; G01S 7/4802;
(Continued)

(56) References Cited

U.S. PATENT DOCUMENTS

| | | |
|---|---|---|
| 9,916,703 B2 | 3/2018 | Levinson et al. |
| 2016/0176358 A1 | 6/2016 | Raghu et al. |

(Continued)

FOREIGN PATENT DOCUMENTS

| | | |
|---|---|---|
| KR | 1020180086632 A | 8/2018 |
| WO | 2017079349 A1 | 5/2017 |

OTHER PUBLICATIONS

Hendleton, et al., "Perception, Planning, Control, and Coordination for Autonomous Vehicles", Machines, vol. 5, No. 1, (2017) pp. 6; DOI:10.3390/machines5010006, (2017) 55 pgs.

(Continued)

*Primary Examiner* — Nga X Nguyen
(74) *Attorney, Agent, or Firm* — Botos Churchill IP Law

(57) ABSTRACT

Aspects of the disclosure relate to training and using a model for identifying actions of objects. For instance, LIDAR sensor data frames including an object bounding box corresponding to an object as well as an action label for the bounding box may be received. Each sensor frame is associated with a timestamp and is sequenced with respect to other sensor frames. Each given sensor data frame may be projected into a camera image of the object based on the timestamp associated with the given sensor data frame in order to provide fused data. The model may be trained using the fused data such that the model is configured to, in response to receiving fused data, the model outputs an action label for each object bounding box of the fused data. This output may then be used to control a vehicle in an autonomous driving mode.

25 Claims, 11 Drawing Sheets

(52) U.S. Cl.
CPC ....... *G05D 1/0088* (2013.01); *G06K 9/00348* (2013.01); *G06K 9/00369* (2013.01); *G06K 9/6262* (2013.01); *G05D 2201/0213* (2013.01)

(58) Field of Classification Search
CPC ..... G01S 17/86; G01S 17/89; G06K 9/00369; G06K 9/00348; G06K 9/6262; G06K 9/6289; G06K 9/00805; B60W 30/0956
See application file for complete search history.

(56) References Cited

U.S. PATENT DOCUMENTS

| | | |
|---|---|---|
| 2017/0307751 A1 | 10/2017 | Rohani et al. |
| 2018/0053102 A1 | 2/2018 | Martinson et al. |
| 2018/0067487 A1* | 3/2018 | Xu ........................ G01S 17/86 |
| 2018/0173971 A1 | 6/2018 | Jia et al. |
| 2018/0373980 A1* | 12/2018 | Huval ................ G06K 9/00805 |

OTHER PUBLICATIONS

Damien Matti et al. Combining LiDAR space clustering and convolutional neural networks for pedestrian detection, <IEEE Xplore Digital Library, https://ieeexplore.ieee.org/document/8078512?denied=> <doi:10.1109/AVSS.2017.8078512> retrieved on Jan. 18, 2020.

International Search Report and Written Opinion for Application No. PCT/US2019/056522 dated Feb. 6, 2020.

\* cited by examiner

OBJECT ACTION CLASSIFICATION FOR AUTONOMOUS VEHICLES

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using sensors such as cameras, radar, LIDAR sensors, and other similar devices. For instance, the perception system and/or the vehicle's computing devices may process data from these sensors in order to identify objects as well as their characteristics such as location, shape, size, orientation, heading, acceleration or deceleration, type, etc. This information is critical to allowing the vehicle's computing systems to make appropriate driving decisions for the vehicle.

BRIEF SUMMARY

Aspects of the disclosure provide a method of training a model for identifying actions of objects. The method includes receiving, by one or more server computing devices, a set of LIDAR sensor data frames, each LIDAR sensor frame including an object bounding box corresponding to an object and an action label for the object bounding box. Each LIDAR sensor frame of the set of LIDAR sensor frames is associated with a timestamp and is sequenced with respect to other LIDAR sensor frames of the set of LIDAR sensor frames. The method also includes projecting, by the one or more server computing devices, each given the LIDAR sensor data frame of the set of LIDAR sensor frames into a projection image corresponding to a camera image of the object based on the timestamp associated with the given LIDAR sensor data frame in order to provide fused camera and LIDAR sensor data for the timestamp. The method also includes training, by the one or more server computing devices, the model using the fused camera and LIDAR sensor data in order to improve precision of the model. The model is configured to, in response to receiving additional fused camera and LIDAR data, output an action label for each object bounding box of the additional fused camera and LIDAR data.

In one example, each of the object bounding boxes of the set of LIDAR sensor data frames correspond to pedestrians. In this example, each of the action labels for the object bounding boxes of the set of LIDAR sensor data frames correspond to actions of pedestrians. In this example, the action labels include a label identifying that a pedestrian is walking. In addition or alternatively, the action labels include a label identifying that a pedestrian is running. In addition or alternatively, the action labels include a label identifying that a pedestrian is pushing an object. In addition or alternatively, the action labels include a label identifying that a pedestrian is riding on another object. In addition or alternatively, the action labels include a label identifying that a pedestrian is carrying an object. In another example, the projection image is a blank image representing an image plane of the camera image, and the projecting includes concatenating the projection image with the camera image in order to generate the fused camera and LIDAR data. In another example, the model is trained such that the model is configured to, for a given object bounding box of the additional fused camera image and LIDAR sensor data frame, use one or more historical action labels determined by the model for an object of the given object bounding box in order to output the action label for the given object bounding box. In another example, the model is a deep neural network.

Another aspect of the disclosure provides a method for controlling a vehicle having an autonomous driving mode. The method includes receiving, by one or more computing devices of the vehicle, a LIDAR sensor data frame including an object bounding box corresponding to an object; projecting, by the one or more computing devices, the LIDAR sensor data frame into a projection image corresponding to a camera image of the object based on a timestamp associated with the LIDAR sensor data frame and a timestamp associated with the camera image in order to provide fused camera and LIDAR sensor data for the timestamp; inputting, by the one or more computing devices, the fused camera and LIDAR sensor data into a model in order to determine an action label for the object; and controlling, by the one or more computing devices, the vehicle in the autonomous driving mode based on the action label.

In one example, the object is a pedestrian. In this example, the action label for the object include a label identifying that the pedestrian is walking. Alternatively, the action label for the object include a label identifying that the pedestrian is running. In another example, inputting the fused camera and LIDAR sensor data into the model further provides one or more historical action labels determined by the model for the pedestrian using fused camera and LIDAR sensor data from sensor data captured earlier in time from the LIDAR sensor data frame and the camera image. In this example, the one or more historical action labels are also inputted into the model in order to determine the action label for the object. In another example, the method also includes using the action label in order to generate a trajectory of the vehicle, and wherein controlling the vehicle is further based on the trajectory. In another example, the method also includes providing the action label to a behavior model in order to predict a future behavior of the object, and wherein controlling the vehicle is further based on the predicted future behavior of the object. In another example, the model is a deep neural network.

DETAILED DESCRIPTION

Overview

The technology relates to classifying the actions of perceived objects for autonomous vehicles. For instance, sensors on a vehicle may detect a pedestrian in the vicinity of the vehicle. Sensor data corresponding to observations of the pedestrian at different points in time may be input into a machine learning model which may classify the pedestrian's action, such as walking, jogging, carrying groceries, riding a skateboard, etc. In this regard, the actions of a pedestrian may be classified based on knowledge of the pedestrian's prior actions. These classifications may be used by the various systems of the vehicle in order to determine how to control the vehicle.

In order to classify actions of a perceived object, the aforementioned model must be trained. For instance, a deep neural network may be trained using labeled sensor data generated by a perception system of a vehicle. This sensor data may include fused camera image and LIDAR data points captured by a vehicle's perception system.

In addition, the LIDAR data points may include bounding boxes and associated action labels for objects. In this regard, the fused data may also include action labels. For instance, at least some objects in the LIDAR data points may correspond to objects. These objects, or rather the data points for these objects, may be bounded by a bounding box. The bounding box may define a generalized size and shape of the object as well as its location and may also be associated with information identifying an action of the object. The bounding box may also be associated with other characteristics of the object such as location, shape, size, orientation, heading, acceleration or deceleration, type, etc. The action labels may be initially applied to the bounding boxes, for instance, by human operators, and in some cases, in part by a vehicle's perception system, such as perception system 172. Examples of action labels for objects corresponding to pedestrians may include, for example, descriptors for an action that the human appears to be performing.

As noted above, the fused data including the action labels and bounding boxes as well as any associated information for objects may be used to train the model. In some instances, only the bounding boxes corresponding to pedestrians may be projected and/or input into the model such that the model may be trained to identify actions of pedestrians. In addition, this training data may be time sequenced and used to determine model parameters for the model which can be used to provide an action for an object.

Example Systems

Figure 1:
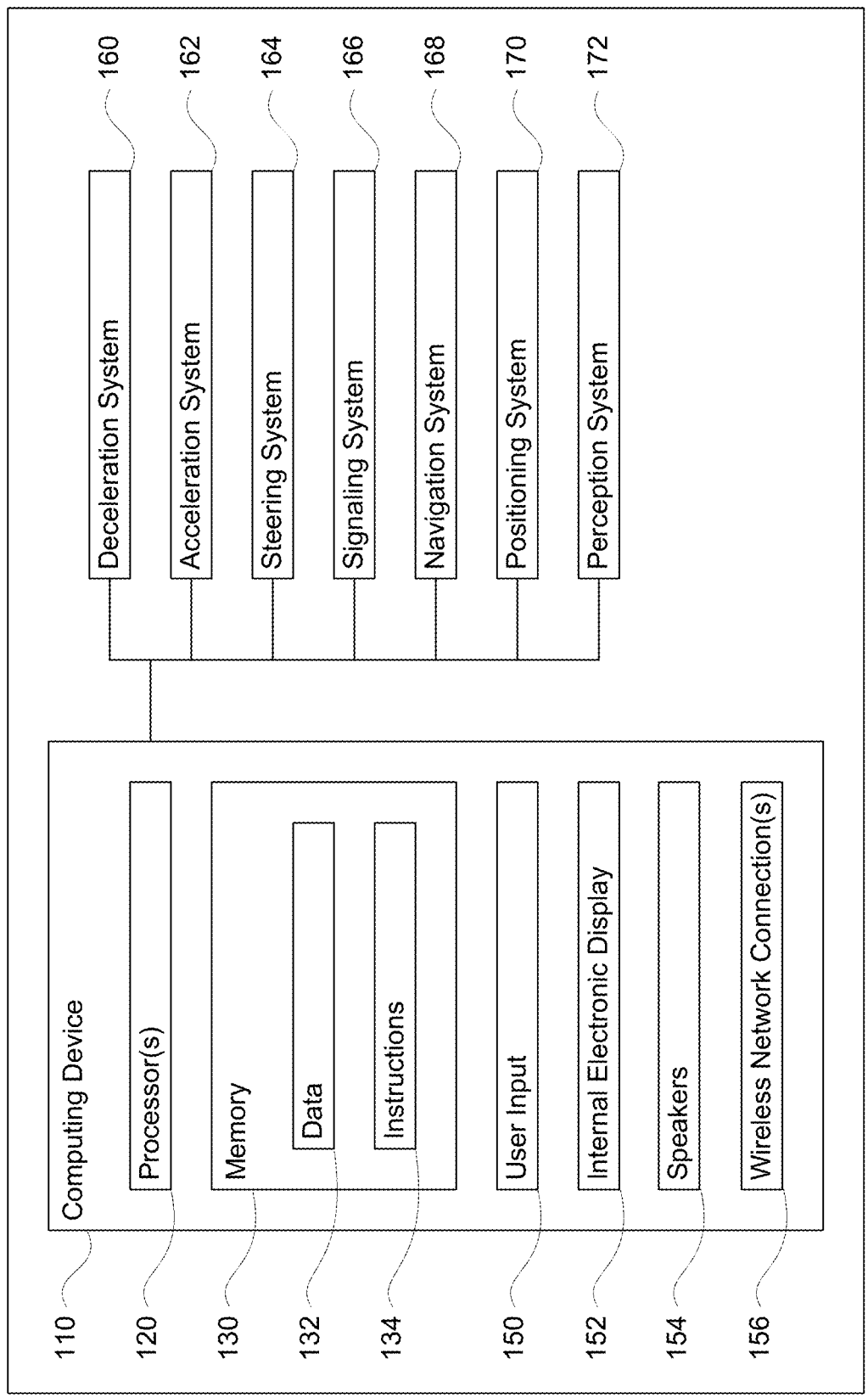
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle in order to control the vehicle in an autonomous driving mode. For example, returning to FIG. 1, computing device 110 may be in communication with various systems of vehicle 100, such as deceleration system 160, acceleration system 162, steering system 164, signaling system 166, navigation system 168, positioning system 170, and perception system 172 in order to control the movement, speed, etc. of vehicle 100 in accordance with the instructions 134 of memory 130 in the autonomous driving mode. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information. As discussed further below, these pull over spots may be "hand" selected or identified areas where at which the vehicle is lawfully able to stop and park for some period of time such as shoulder areas, parking spots, parking lots, emergency pull over spots, etc.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. The vehicle may include a laser or other sensors mounted on the roof or other convenient location.

In order to operate in an autonomous driving mode, the computing devices 110 may generate and cause the vehicle to follow a trajectory that defines locations at which the vehicle should be located at future times. These trajectories may be generated periodically, such as every 0.1 seconds or more or less, as "desired paths" in order to avoid obstacles, obey laws and generally control the vehicle safely and effectively. Each trajectory may define various requirements for the vehicle's acceleration, speed, and position at different times along the trajectory. In this regard, the trajectory may include both geometry and speed/acceleration components. As an example, the computing devices 110 may operate to manage steering, powertrain and braking in order to cause the vehicle to follow a current (or last generated) trajectory. In order to do so, computing devices 110 may receive feedback from the vehicles sensors including sensors of and/or the perception system 172 and the positioning system 170. This feedback may include information such as the current acceleration, speed, and position of the vehicle.

The computing device 110 may control the vehicle by controlling various components. For instance, by way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
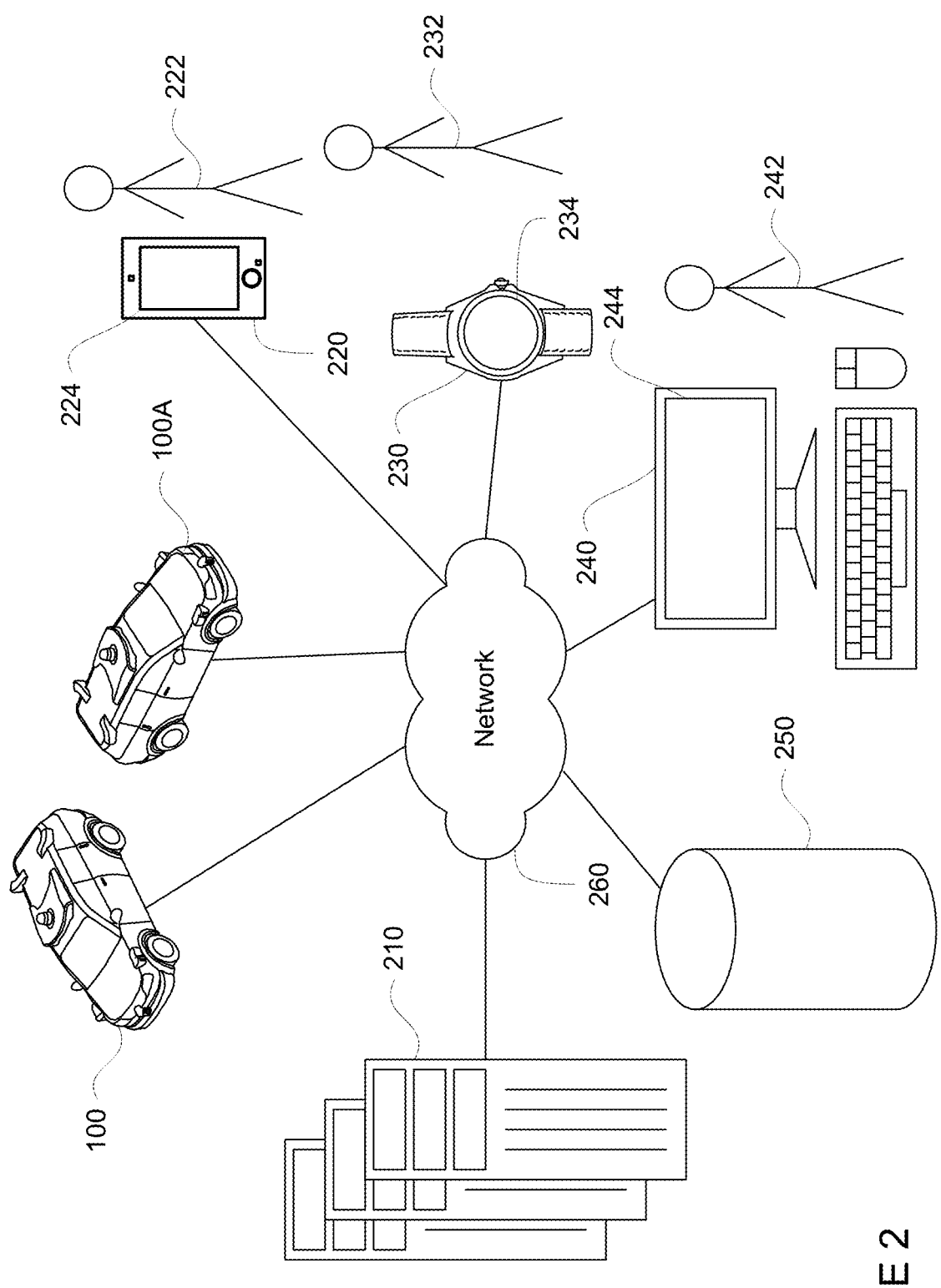
FIG. 2 is a pictorial diagram of an example system in accordance with aspects of the disclosure.
Figure 3:
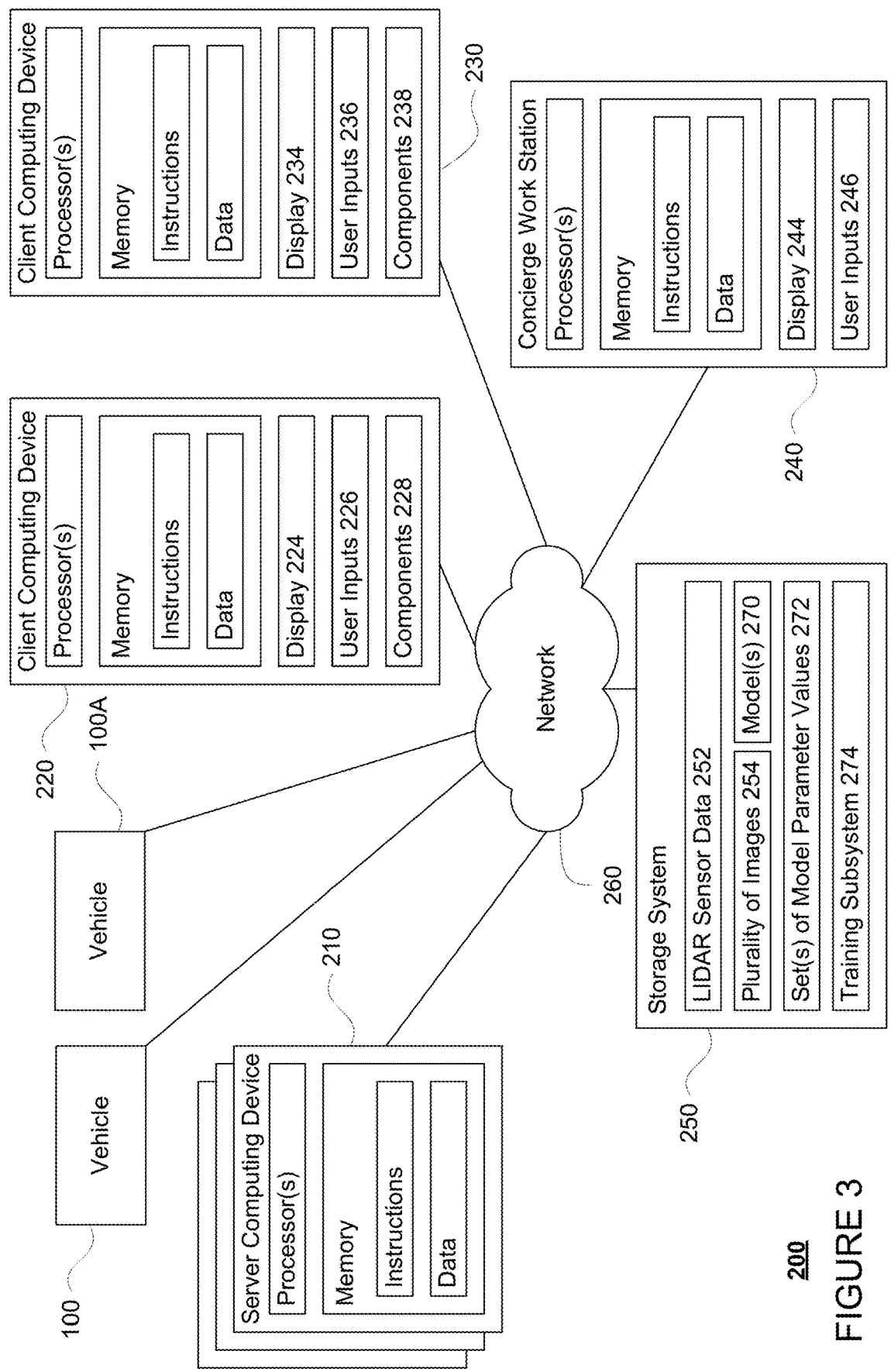
FIG. 3 is a functional diagram of the system of FIG. 2 in accordance with aspects of the disclosure.

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232, 242 on a display, such as displays 224, 234, 244 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touchscreen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a wrist watch in FIG. 2. As an example, the user may input information using a small keyboard, a keypad, microphone, using visual signals with a camera, or a touch screen.

In some examples, client computing device 240 may be a concierge work station used by an administrator to provide concierge services to users such as users 222 and 232 as well as responses to requests for assistance from vehicles 100 and 100A as needed. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For instance, the storage system may store a plurality of images 254. This plurality of images may include images captured by a perception system of an autonomous vehicle in order to provide the most relevant context and orientation of signs that may appear in those images. For instance, the plurality of images may be images or frames captured by still and/or video cameras mounted on one or more vehicles such as vehicles 100 or 100A and uploaded via network 260 or otherwise sent to the storage system 250 for storage. Thus, the images may accurately reflect perception of the road and various objects from the perspective of the cameras or perception system of the vehicle. At least some of these images may be associated with OCR data as well as labels as discussed further below.

The storage system 250 may also store LIDAR sensor data 252 captured by a vehicle's perception system, such as perception system 172 of vehicle 100. For instance, the LIDAR sensor data may include data points corresponding to the locations and intensity (or reflectivity) of surfaces off of which light generated by the LIDAR sensor is reflected back to LIDAR sensor. A LIDAR sensor frame may correspond to data generated from 1 or more 360 degree scans or rotations of a LIDAR sensor.

In some instances, at least some of the LIDAR sensor data 252 may be fused with one or more camera images of the plurality of images 254. For instance, LIDAR data points for an entire frame or scene (rather than a single object) captured by a perception system of a vehicle, such as vehicle 100, at a given timestamp in time may be projected into a camera image captured by the perception system of the vehicle having timestamp that corresponds to the given timestamp the LIDAR data points. The result may be fused camera and LIDAR data including RGB color channel data as well as intensity, elevation and depth information. Because the camera image and LIDAR data points are captured close to or at the same time, the camera image and LIDAR data are likely to have captured the object at the same location at or very close to the same time.

In addition, at least some of the LIDAR sensor data 252 may include action labels for objects. In this regard, the fused data may also include action labels. Each action label may include a bounding box bounding or containing data points of the LIDAR sensor data identified as belonging to the object as well as an action label identifying an action of the object for a LIDAR sensor frame. Of course the action label for the same object appearing in different LIDAR sensor frames may change as the object's actions change. For example, a bounding box for an object may have a label "walking" for one LIDAR sensor frame, and in another LIDAR sensor frame captured a few seconds later, a bounding box for that same object may have a label "entering a vehicle." In some instances, the action labels may also include additional information, such as heading, speed, acceleration or deceleration, orientation, etc. Alternatively, this information can be estimated or derived from the action labels themselves over time from the LIDAR data points.

The action labels may be initially applied to the LIDAR data points, for instance, by human operators, and in some cases, in part by a vehicle's perception system. For instance, the vehicle's perception system may generate a three-dimensional (3D) bounding box which bounds the LIDAR data points corresponding to an object. Thereafter the human operator may adjust the bounding box, making it larger or smaller and/or shifting position of the bounding box if needed, and adding an action label. In addition or alternatively, bounding boxes may be both created and applied to the LIDAR data by a human operator.

For instance, a human operator may be shown a series of timestamped frames, for instance 3 or more or less, and may apply the aforementioned action labels to the objects, such as pedestrians, in those frames. Each frame may be time sequenced such that the frames progress through time. In that regard, a first frame may correspond to a time immediately before a second frame that may correspond to a time immediately before a third frame. In addition or alternatively, the labels may be generated by human operators from a combination of LIDAR and camera images where the human operator needs to ensure that the bounding box is correct in LIDAR data as well as in camera image or images. In addition or alternatively, the bounding boxes may be applied by a human operator to camera images and then projected into the space of the LIDAR data points.

As an example, action labels for objects corresponding to pedestrians may include, for example, descriptors for an action that the human appears to be taking. An example list of action labels may include running, pushing a stroller, pushing a large object, holding an object, entering a vehicle, exiting a vehicle, riding a scooter, riding a skateboard, walking, riding a bicycle, and so on.

The storage system 250 as well as data 132 of vehicle 100 may store one or more models 270 as well as model parameter values 272 for each such model. For instance, the storage system may store one or more models for identifying action labels for objects such as pedestrians. For instance, one of the models 270 may include a classifier, such as a neural network, a deep neural networks, decision trees, boosting trees, etc. In addition, the storage system 250 may include a training subsystem 274 that can be used to train the phrase recognition model as discussed further below.

As with memory 130, storage system 250 can be of any type of computer storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2 and/or may be directly connected to or incorporated into any of the computing devices 110, 210, 220, 230, 240, etc.

Figure 4:
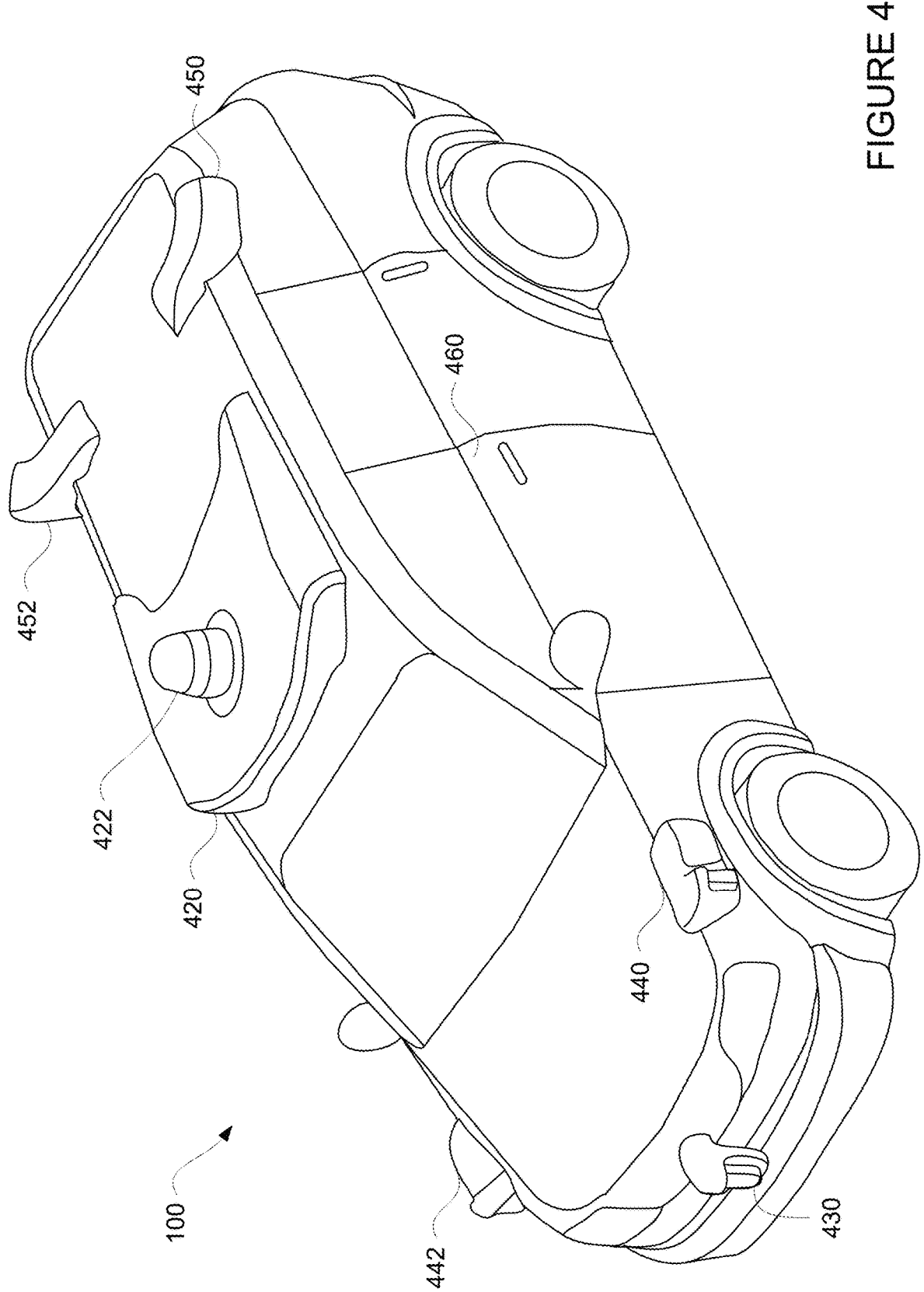
FIG. 4 is an example external view of a vehicle in accordance with aspects of the disclosure.

Vehicle 100 also includes sensors of the perception system 172. FIG. 4 is an example configuration for vehicle 100. In this example, roof-top housing 420 and dome housing 422 may include a LIDAR sensor as well as various cameras and radar units. In addition, housing 430 located at the front end of vehicle 100 and housings 440, 442 on the driver's and passenger's sides of the vehicle may each store a LIDAR sensor. For example, housing 440 is located in front of driver door 460. Vehicle 100 also includes housings 450, 452 for radar units and/or cameras also located on the roof of vehicle 100. Additional radar units and cameras (not shown) may be located at the front and rear ends of vehicle 100 and/or on other positions along the roof or roof-top housing 420. Each of these radar, camera, and laser sensors or devices may be associated with processing components which process data from these devices as part of the perception system 172 and provide sensor data to the computing device 110. Moreover, at least some of these sensors, such as LIDAR sensors and cameras, may have overlapping fields of view to facilitate the features discussed further herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to be able to use a model of the one or more models 270 to identify action labels for an object, the model may first be trained "offline" that is, ahead of time and/or at a remote computing device and thereafter sent to the vehicle 100 via network 260 and wireless network connections 156. For instance, one or more of server computing devices 210 may generate the model parameter values 274 by first retrieving training data from the storage system 250.

For instance, the one or more server computing devices 210 may retrieve a set of LIDAR sensor data frames. As noted above, these LIDAR sensor frames may be associated with an object bounding box corresponding to an object as well as action labels for the one or more bounding boxes. Each LIDAR sensor data frame may also be time sequenced based on timestamp with respect to other LIDAR sensor frames of the LIDAR sensor frames.

Figure 5:
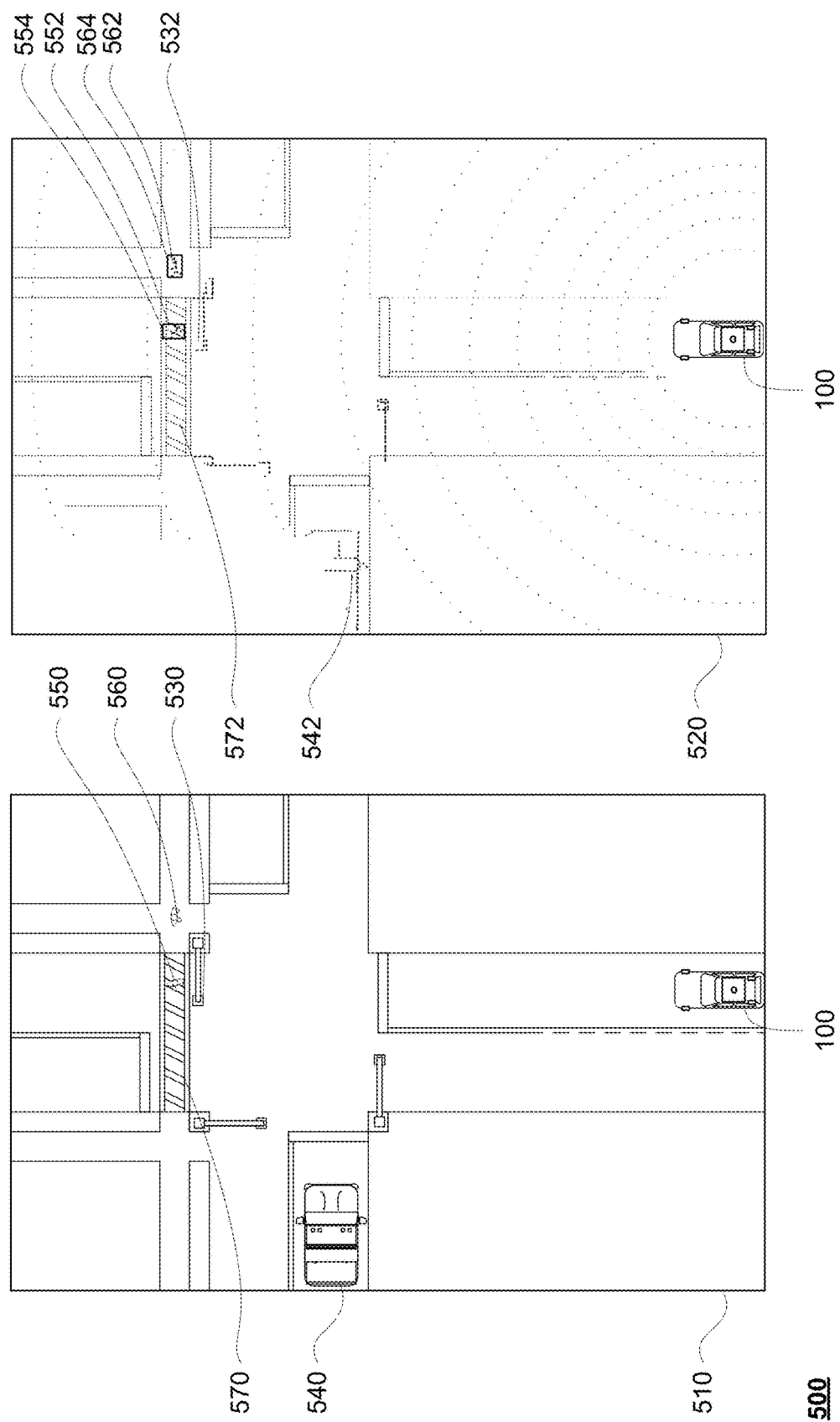
FIG. 5 is an example top-down view and corresponding portion of a LIDAR sensor frame in accordance with aspects of the disclosure.

FIG. 5 is an example 500 of a top-down view 510 of vehicle 100 and an area around vehicle 100 as well as a portion of a LIDAR sensor frame 520 generated by a LIDAR sensor of perception system 172 corresponding to the top-down view 510. In this example, the dots of LIDAR sensor frame 520 represent LIDAR returns indicative of the surfaces of objects in vehicle 100's environment generated by the LIDAR sensor. Vehicle 100 is represented with sensor data 520 for ease of understanding but may not actually be part of the sensor data 520. In addition, the top-down view 510 provides context for the features, including traffic light 530, vehicle 540, pedestrians 550 and 560, crosswalk 570, represented by the LIDAR data points indicative of surfaces of corresponding detected objects 532, 542, 552, 562, and 572, respectively, of the LIDAR sensor frame 520.

Figure 6:
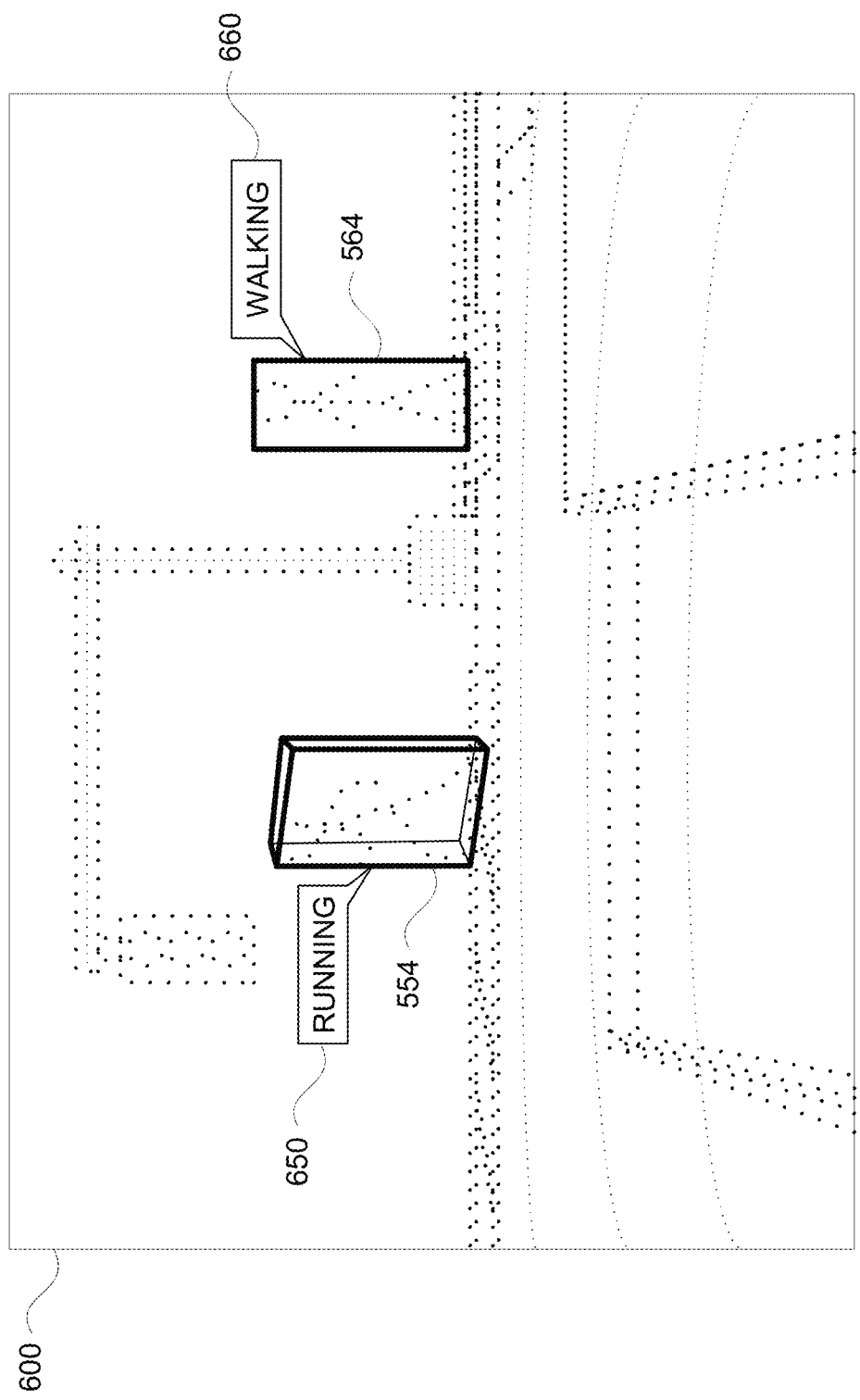
FIG. 6 is an example perspective view of the LIDAR sensor frame in accordance with aspects of the disclosure.

In the example 500 of FIG. 5, the groups of points of objects 552 and 562 corresponding to the surfaces of pedestrians 550 and 560 are fitted into bounding boxes 554 and 564, respectively. Although depicted as 2D because of the perspective of sensor data 520, the bounding boxes 554, 564 are actually 3D volumes. In this regard, FIG. 6 provides an example 600 side perspective view of the LIDAR sensor frame 520 including bounding boxes 554, 564. In addition, the perception system 172 may use the group of points within the bounding box as well as the changes to those points and/or the bounding box over time, in order to determine various characteristics of the objects such as location, shape, size, orientation, heading, acceleration or deceleration, type, etc.

As noted above, these bounding boxes may be reviewed by human operators which provide action labels to the bounding boxes when reviewing a series of time sequenced LIDAR sensor frames. In this regard, each of bounding boxes 554 and 564 include an associated action label 650 and 660, respectively. In this example, a human operator may have labeled the bounding box 554 corresponding to pedestrian 550 as "running" and the bounding box 564 corresponding to pedestrian 560 as "walking".

In addition, the one or more server computing devices 210 may retrieve one or more camera images. Which camera images to retrieve may be determined based on the timestamps associated with the camera image and the LIDAR sensor data frame as well as other information about the perception system that captured the images. For instance, the timestamps should be as close in time as possible and the LIDAR sensor data and camera images captured by sensors of the perception system 172 that have overlapping fields of view. In this regard, the same object should be captured in both the LIDAR sensor data frame and the camera image.

Figure 7:
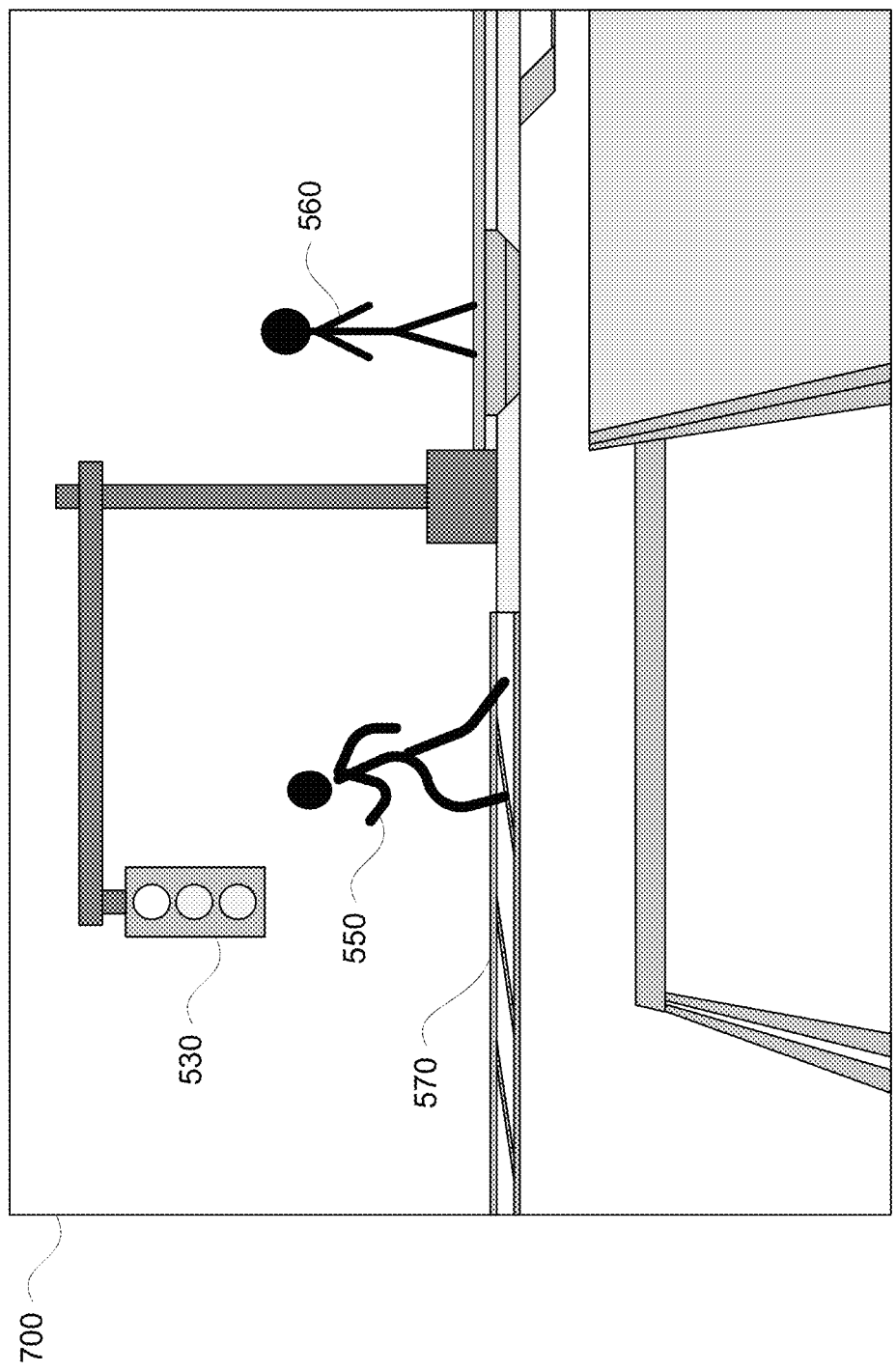
FIG. 7 is an example camera image in accordance with aspects of the disclosure.

FIG. 7 is an example camera image 700 captured by a camera of perception system 172 of vehicle 100. In this example, the timestamp for the camera image may be the same or very close to the timestamp of the LIDAR sensor data 520, for instance, within a tenth of a second or even within few milliseconds. In this example, traffic light 530, pedestrians 550 and 560, and crosswalk 570 are all captured in camera image 700 as the timestamp of camera image 700 may be the same as or very close to the timestamp of the LIDAR sensor frame 520. Vehicle 540 is not shown as it is outside of the field of view of the camera image 700.

The one or more server computing devices 210 may also generate the fused data. For instance, the one or more computing devices 210 may project each given the LIDAR sensor data frame of the set of LIDAR sensor frames into an image (hereafter the projection image) corresponding to a camera image of the object. In this regard, the projection image may initially be (or rather, before the projecting) be a blank, for instance black or white image, representing the image plane of the camera image. For instance, the one or more computing devices 210 may project the set of the LIDAR sensor frames into a projection image with the same coordinates of the camera image of the object. The projected image may then be concatenated with the camera image in the dimension of its RGB channels. For instance, if the camera image is of dimension H×W×3, the projected image would be H×W×C, and the final image would be H×W×(C+3). As such, the projection may be done based on the location and orientation of the camera image as well as the location of the data points of the LIDAR sensor frame such that at least some of the data points of the LIDAR sensor frame may be projected onto locations in the projected image corresponding to surfaces of features in the camera image. The result may be fused camera and LIDAR data including RGB color channel data as well as intensity, elevation and depth information. In some instances, map information, for example high-definition maps, may also be projected into the image plane to provide additional context to the fused camera and LIDAR data.

Figure 8A:
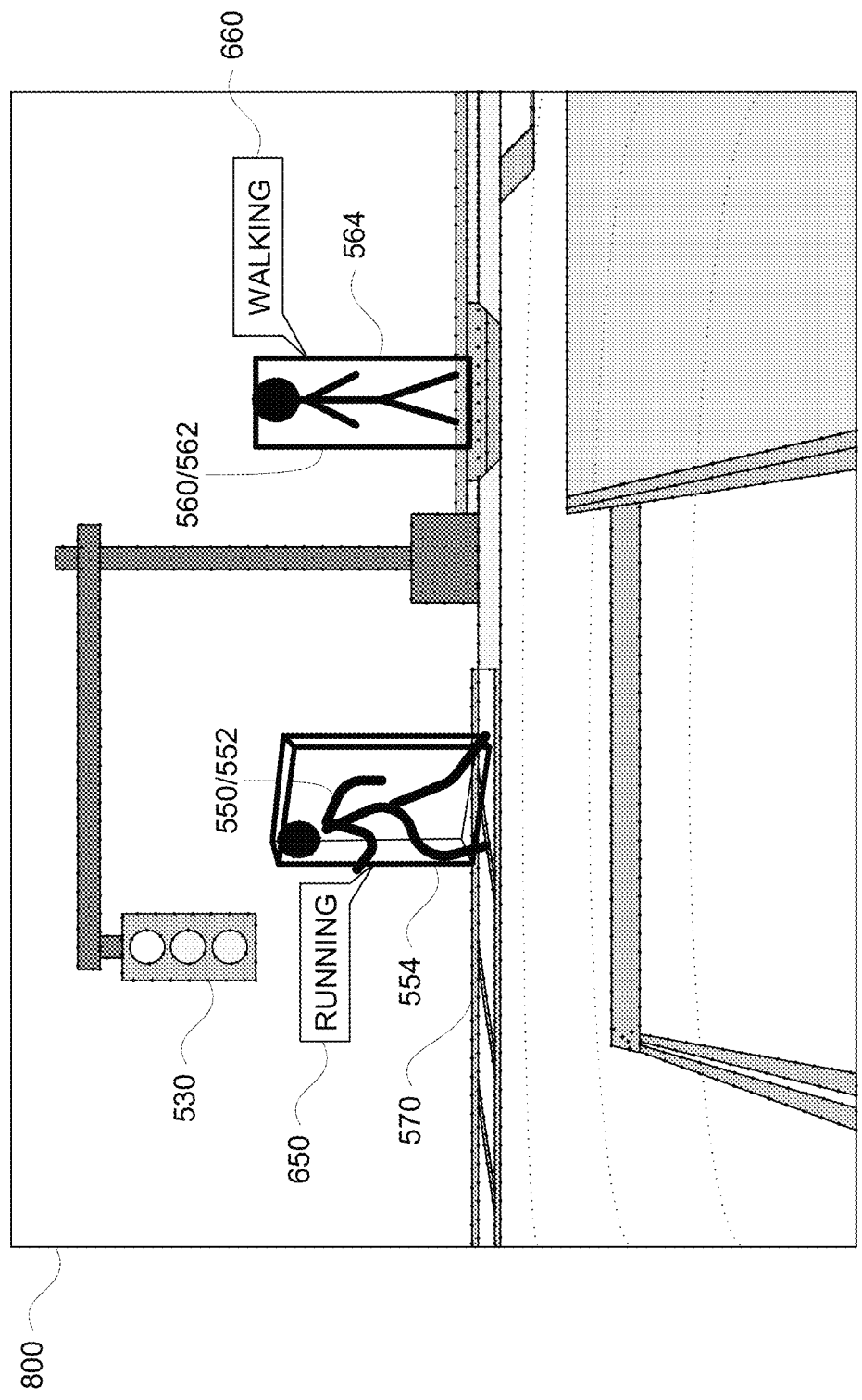
FIGS. 8A and 8B are an example of fused data in accordance with aspects of the disclosure.
Figure 8B:
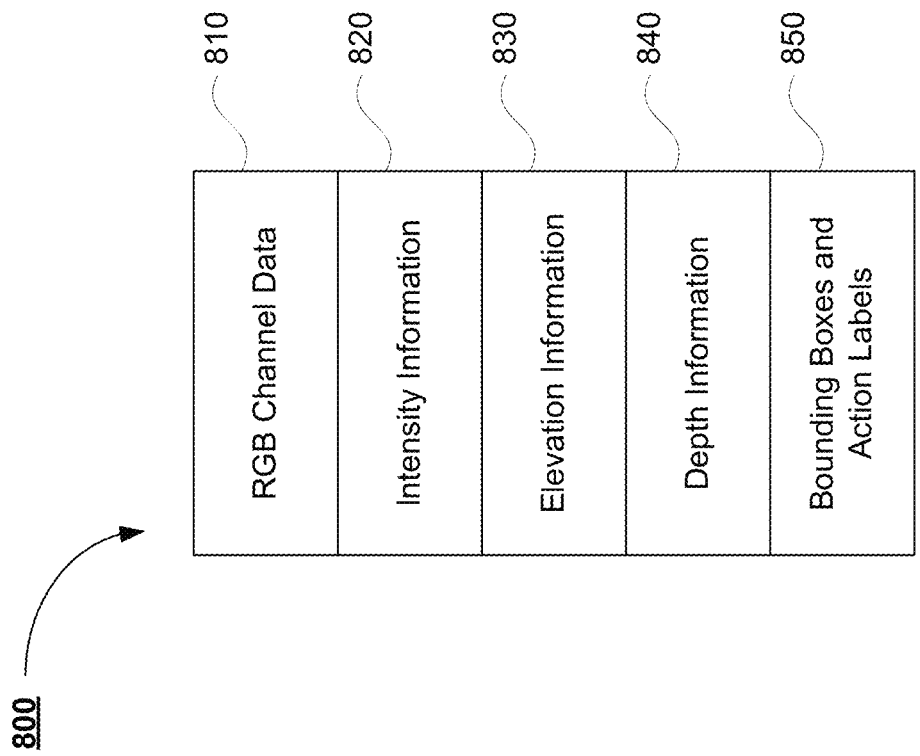

In addition, because the LIDAR sensor data may include action labels, the projection also projects the action labels, including bounding boxes, into the projected image. Thus, the fused data also includes the action labels. FIGS. 8A and 8B represent fused data 800. Turning to the example of FIG. 8A, the LIDAR sensor frame 520 and bounding boxes 554 and 556, representative of objects corresponding to pedestrians, are shown as projected into camera image 600. As can be seen, bounding boxes 554 and 556 and corresponding action labels 650, 660 have been projected onto the portions of the camera image 600 corresponding to pedestrians 550 and 560. FIG. 8B is another representation of fused data 800 representing the data incorporated therein including the RGB channel data 810 of camera image 700 as well as intensity 820, elevation 830, and depth information 840 of LIDAR sensor frame 520. In addition, FIG. 8B includes bounding boxes and action labels 850 representing the aforementioned bounding boxes 554 and 556 and corresponding action labels 650, 660.

The one or more server computing devices 210 may then use the fused data to train the model. For instance, fused data 800 including the action labels 650 and 660 for any pedestrians within the frames of the fused data may be used to train the model. The more fused camera and LIDAR data used to train the model, the better the model will become at predicting labels for objects. In this regard, the training may increase or improve the precision and accuracy of the model's output predictions or labels.

This training data may be time sequenced based on the timestamps of the LIDAR sensor data frames (and/or camera images) and used to determine model parameters for the model which can be used to provide an action for an object. Because the model is trained using an entire frame, and not simply the action labels and data captured within bounding boxes, the model is able to use the larger context around the object, for instance the relative positions and other characteristics of other objects, to better establish the parameters for the model. In addition, because the input frames are time sequenced, the model is able to output action labels, as well as historical information for each labeled object, or rather, what prior or historical action labels were applied to that pedestrian.

Because the model is not provided with information linking the same object in different frames of the fused data but the frames of the fused data are time sequenced, the model may be trained to identify these relationships itself. In this regard, the model may provide both labeling of actions of objects and tracking of those objects over time jointly. This may be based on, for instance, prior or historical action labels for an object in a prior frame of fused data as well as a comparison of the characteristics, such as location, speed, heading, etc. of that object in one or more prior frames to the current frame. The result may be a model that is able to use prior action labels and bounding boxes, as well as other characteristics identifiable from the fused data for an object in order to determine a new action label including a bounding box and for that object later in time.

Figure 9:
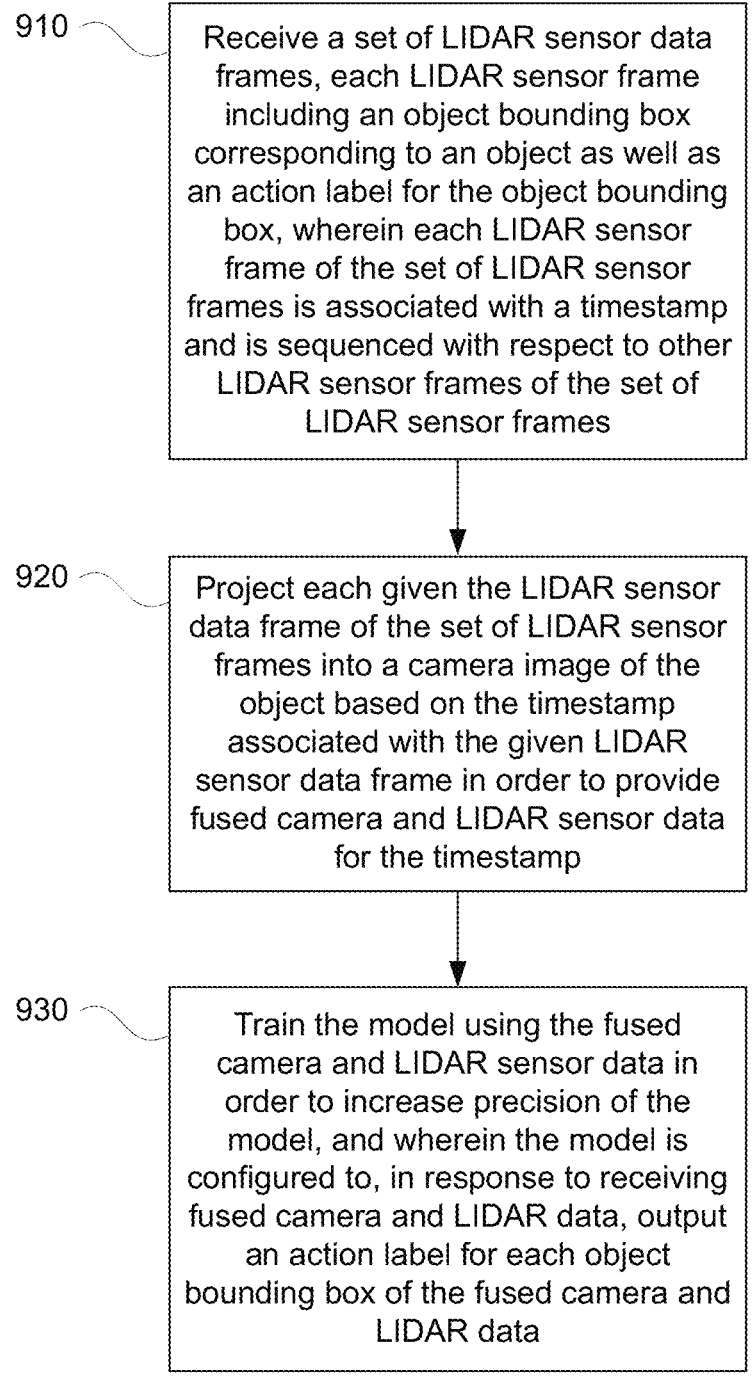
FIG. 9 is an example flow diagram in accordance with aspects of the disclosure.

FIG. 9 is an example flow diagram 900 in accordance with aspects of the disclosure which may be performed by one or more processors of one or more computing devices, such as the processors of server computing devices 210, in order to train a model for identifying actions of objects. For instance, at block 910, a set of LIDAR sensor data frames is received. Each LIDAR sensor frame including an object bounding box corresponding to an object as well as an action label for the bounding box. Each LIDAR sensor frame of the set of LIDAR sensor frames is associated with a timestamp and is sequenced with respect to other LIDAR sensor frames of the set of LIDAR sensor frames. At block 920, each given the LIDAR sensor data frame of the set of LIDAR sensor frames is projected into a projection image corresponding to a camera image of the object based on the timestamp associated with the given LIDAR sensor data frame in order to provide fused camera and LIDAR sensor data for a time of the timestamp. At block 930, the model is trained using the fused camera and LIDAR sensor data in order to improve the precision of the model, and wherein the model is configured to, in response to receiving additional fused camera and LIDAR data, output an action label for each object bounding box of the additional fused camera and LIDAR data.

The model may then be provided to one or more vehicles in order to allow the computing devices of those vehicles to make better informed driving decisions. For instance, the model 270 and model parameter values 274 may be sent to the computing devices 110 of vehicle 100, for instance via network 260, or by otherwise loading this information into the computing devices 110. This information may then be stored in the memory 130 of the computing devices 110 in order to allow the computing devices to use the phrase recognition model to make driving decisions for the vehicle 100.

During operation, for each LIDAR sensor frame captured by the vehicle's perception system 172, the perception system 172 and/or the computing devices may generate a plurality of bounding boxes identifying objects and their characteristics, such as object types. For the purposes of demonstration, LIDAR sensor frame 520, camera image 600, and fused data 800 will be referred to as if such information was not used to train the model 270. For instance, at this point the perception system 172 may capture LIDAR sensor frames and camera images, such as LIDAR sensor frame 520 and camera image 600.

Each LIDAR sensor frame and any associated bounding boxes for objects may be projected into a corresponding projection image representing an image space of a corresponding camera image in order to generate fused camera and LIDAR data, as shown by the example of fused data 800 of FIG. 8 representing the LIDAR sensor frame and bounding boxes 554 and 564 projected into camera image 600 (though without the action labels 650 and 660). Again, this projection may be done based on the location and orientation of the camera image as well as the location of the data points of the LIDAR sensor frame such that at least some of the data points of the LIDAR sensor frame may be projected onto locations of the projection image representing the surfaces of features in the camera image. The projected image may then be concatenated with the camera image in the dimension of its RGB channels, as described above, in order to provide the fused camera and LIDAR data.

Of course, which LIDAR sensor data frame to be fused with which camera image may be determined based on the timestamps associated with the camera image and the LIDAR sensor data frame as well as other information about the perception system that captured the images. For instance, the timestamps should be as close in time as possible and the LIDAR sensor data and camera images captured by sensors of the perception system 172 that have overlapping fields of view. In some instances, only the bounding boxes for specific types of objects, such as only pedestrians, may be projected into the camera image.

The computing devices 110 may then use the model 270 to process this information and output action labels for each object. For instance, the fused camera and LIDAR sensor data of fused data 800 (again without action labels 650, 660) may be input into the model 270. The model 270 may output an action label for each bounding box in the frame identified as a pedestrian. In this regard, the model may output action labels such as action labels 650 and 660. In addition, if any of those pedestrians were observed in a prior sensor data frame, this historical information, for instance, historical action labels for each pedestrian, would also be outputted. Thereafter, the output action label and the historical action label would be used as input to the model in order to label objects in the next frame (or rather the fused camera and LIDAR sensor data for the next frame) input into the model.

The output of the model 270 may then be used by the computing devices 110 to make driving decisions for the vehicle 100. For instance, the action label for a pedestrian may be used by the computing devices 110 to determine how to maneuver the vehicle in the autonomous driving mode. In other words, the computing devices 110 may use the action labels to generate trajectories for different types of pedestrian actions. For instance, a vehicle may need to respond differently to a pedestrian who is walking than a pedestrian who is running or using a scooter. In addition or alternatively, the action label for a pedestrian may be fed into a pedestrian behavior model in order to predict a future behavior, path and/or trajectory for the pedestrian. This information, in turn, may then be used by the vehicle's computing devices to generate trajectories in order to respond to the pedestrian as discussed above.

Figure 10:
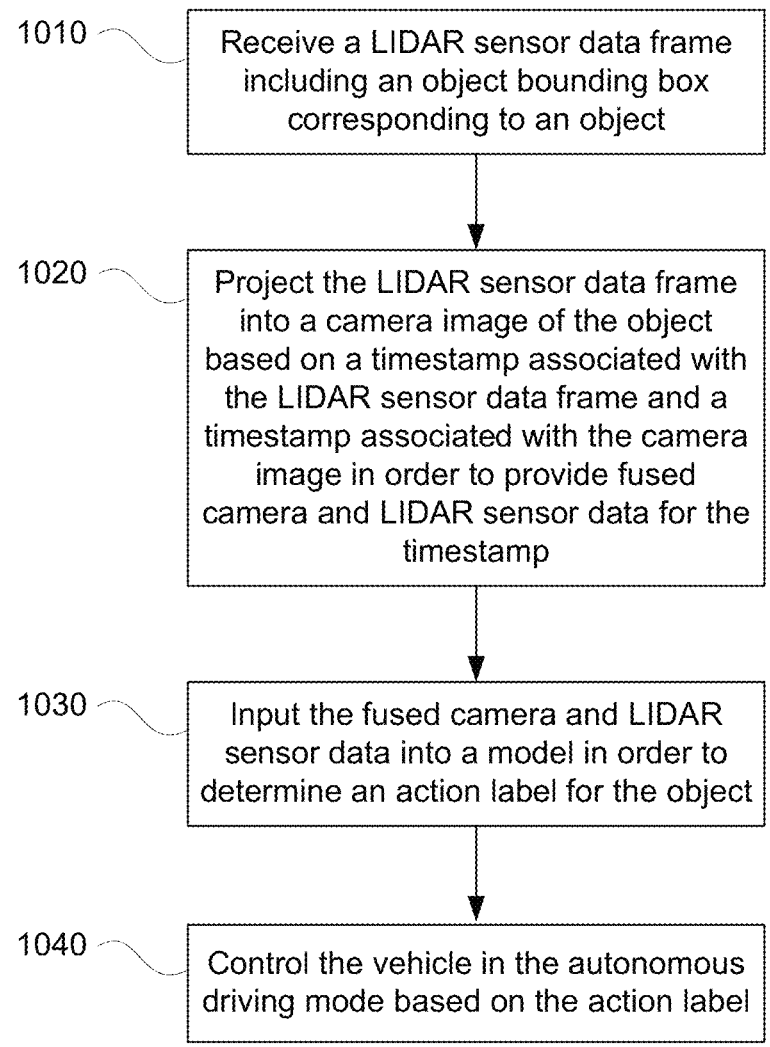
FIG. 10 is an example flow diagram in accordance with aspects of the disclosure.

FIG. 10 is an example flow diagram 1000 in accordance with aspects of the disclosure which may be performed by one or more processors of one or more computing devices, such as processors 120 of computing devices 110, in order to control a vehicle, such as vehicle 100, in an autonomous driving mode. At block 1010, LIDAR sensor data frame including an object bounding box corresponding to an object is received. At block 1020, the LIDAR sensor data frame is projected into a projection image corresponding to a camera image of the object based on a timestamp associated with the LIDAR sensor data frame and a timestamp associated with the camera image in order to provide fused camera and LIDAR sensor data for a given time period. At block 1030, the fused camera and LIDAR sensor data are input into a model in order to determine an action label for the object. At block 1040 vehicle is then controlled in the autonomous driving mode based on the action label.

While the features described herein relate to using fused LIDAR sensor data frames and camera images, alternatively, the same process may occur using only LIDAR sensor data frames or only camera images. In addition or alternatively, the model may be trained to handle LIDAR sensor data or camera images in which an object appears in one and not the other.

The features described herein may thus allow a vehicle's computing devices to better respond to pedestrians by attempting to identify current actions of pedestrians. In addition, as noted above, the model may provide both prediction of actions of objects and tracking of objects over time. This, in turn, may be used to improve the usefulness of various downstream systems of the vehicle, such as the aforementioned behavior models that predict a pedestrian's future behaviors, paths, and/or trajectories as well as for trajectory generation based on the predicted future behaviors, paths, and/or trajectories.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments.

Further, the same reference numbers in different drawings can identify the same or similar elements.

The invention claimed is:

1. A method of training a model for identifying actions of objects, the method comprising:
    receiving, by one or more server computing devices, a set of LIDAR sensor data frames, each LIDAR sensor frame including an object bounding box corresponding to an object and an action label for the object bounding box, wherein each LIDAR sensor frame of the set of LIDAR sensor frames is associated with a first timestamp and is sequenced with respect to other LIDAR sensor frames of the set of LIDAR sensor frames;
    projecting, by the one or more server computing devices, each given the LIDAR sensor data frame of the set of LIDAR sensor frames into a projection image corresponding to a camera image of the object having a second timestamp in order to provide fused camera and LIDAR sensor data for the first timestamp, the first and second timestamps being concurrent or close in time such that the camera image of the object and the LIDAR sensor data have an overlapping field of view; and
    training, by the one or more server computing devices, the model using the fused camera and LIDAR sensor data in order to improve precision of the model, and wherein the model is configured to, in response to receiving additional fused camera and LIDAR sensor data, output an action label for each object bounding box of the additional fused camera and LIDAR sensor data.

2. The method of claim 1, wherein each of the object bounding boxes of the set of LIDAR sensor data frames correspond to pedestrians.

3. The method of claim 2, wherein each of the action labels for the object bounding boxes of the set of LIDAR sensor data frames correspond to actions of pedestrians.

4. The method of claim 3, wherein the action labels include a label identifying that a pedestrian is walking.

5. The method of claim 3, wherein the action labels include a label identifying that a pedestrian is running.

6. The method of claim 3, wherein the action labels include a label identifying that a pedestrian is pushing an object.

7. The method of claim 3, wherein the action labels include a label identifying that a pedestrian is riding on another object.

8. The method of claim 3, wherein the action labels include a label identifying that a pedestrian is carrying an object.

9. The method of claim 1, wherein the projection image is a blank image representing an image plane of the camera image, and wherein the projecting includes concatenating each projection image with each corresponding camera image in order to generate the fused camera and LIDAR sensor data.

10. The method of claim 1, wherein the model is trained such that the model is configured to, for a given object bounding box of the additional fused camera image and LIDAR sensor data frame, use one or more historical action labels determined by the model for an object of the given object bounding box in order to output the action label for the given object bounding box.

11. The method of claim 1, wherein the model is a deep neural network.

12. A system for training a model for identifying actions of objects, the system comprising one or more server computing devices configured to:
    receive a set of LIDAR sensor data frames, each LIDAR sensor frame including an object bounding box corresponding to an object and an action label for the object bounding box, wherein each LIDAR sensor frame of the set of LIDAR sensor frames is associated with a first timestamp and is sequenced with respect to other LIDAR sensor frames of the set of LIDAR sensor frames;
    project each given the LIDAR sensor data frame of the set of LIDAR sensor frames into a projection image corresponding to a camera image of the object having a second timestamp in order to provide fused camera and LIDAR sensor data for the first timestamp, the first and second timestamps being concurrent or close in time such that the camera image of the object and the LIDAR sensor data have an overlapping field of view; and
    train the model using the fused camera and LIDAR sensor data in order to improve precision of the model, and wherein the model is configured to, in response to receiving additional fused camera and LIDAR sensor data, output an action label for each object bounding box of the additional fused camera and LIDAR sensor data.

13. The system of claim 12, wherein each of the object bounding boxes of the set of LIDAR sensor data frames correspond to pedestrians.

14. The system of claim 13, wherein each of the action labels for the object bounding boxes of the set of LIDAR sensor data frames correspond to actions of pedestrians.

15. The system of claim 14, wherein the action labels include a label identifying that a pedestrian is walking.

16. The system of claim 14, wherein the action labels include a label identifying that a pedestrian is running.

17. The system of claim 14, wherein the action labels include a label identifying that a pedestrian is pushing an object.

18. The system of claim 14, wherein the action labels include a label identifying that a pedestrian is riding on another object.

19. The system of claim 14, wherein the action labels include a label identifying that a pedestrian is carrying an object.

20. The system of claim 12, wherein the projection image is a blank image representing an image plane of the camera image, and wherein the one or more server computing devices are further configured to project each given the LIDAR sensor data frame of the set of LIDAR sensor frames by concatenating each projection image with each corresponding camera image in order to generate the fused camera and LIDAR sensor data.

21. The system of claim 12, wherein the model is trained such that the model is configured to, for a given object bounding box of the additional fused camera image and LIDAR sensor data frame, use one or more historical action labels determined by the model for an object of the given object bounding box in order to output the action label for the given object bounding box.

22. The method of claim 1, wherein the camera image of the object and the LIDAR sensor data are captured by sensors of a perception system of a vehicle that have overlapping fields of view at the concurrent time or close in time.

23. The method of claim 1, wherein, when the first and second timestamps are not concurrent, the first and second timestamps are within a tenth of a second.

24. The system of claim 12, wherein the camera image of the object and the LIDAR sensor data are captured by sensors of a perception system of a vehicle that have overlapping fields of view at the concurrent time or close in time.

25. The system of claim 12, wherein, when the first and second timestamps are not concurrent, the first and second timestamps are within a tenth of a second.

\* \* \* \* \*

UNITED STATES PATENT AND TRADEMARK OFFICE
CERTIFICATE OF CORRECTION

PATENT NO. : 11,061,406 B2  
APPLICATION NO. : 16/167007  
DATED : July 13, 2021  
INVENTOR(S) : Junhua Mao Page 1 of 2

It is certified that error appears in the above-identified patent and that said Letters Patent is hereby corrected as shown below:

In the Claims

Claim 1, Column 15, Lines 23-24:  
Now reads: "LIDAR sensor frame"; should read -- LIDAR sensor data frame --

Claim 1, Column 15, Line 26:  
Now reads: "LIDAR sensor frame"; should read -- LIDAR sensor data frame --

Claim 1, Column 15, Line 27:  
Now reads: "LIDAR sensor frames"; should read -- LIDAR sensor data frames --

Claim 1, Column 15, Lines 28-29:  
Now reads: "LIDAR sensor frames"; should read -- LIDAR sensor data frames --

Claim 1, Column 15, Line 29:  
Now reads: "LIDAR sensor frames"; should read -- LIDAR sensor data frames --

Claim 1, Column 15, Line 32:  
Now reads: "LIDAR sensor frames"; should read -- LIDAR sensor data frames --

Claim 12, Column 16, Lines 17-18:  
Now reads: "LIDAR sensor frame"; should read -- LIDAR sensor data frame --

Claim 12, Column 16, Line 20:  
Now reads: "LIDAR sensor frame"; should read -- LIDAR sensor data frame --

Claim 12, Column 16, Line 21:  
Now reads: "LIDAR sensor frames"; should read -- LIDAR sensor data frames --

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,061,406 B2

Claim 12, Column 16, Line 23:
Now reads: "LIDAR sensor frames"; should read -- LIDAR sensor data frames --

Claim 12, Column 16, Lines 23-24:
Now reads: "LIDAR sensor frames"; should read -- LIDAR sensor data frames --

Claim 12, Column 16, Line 26:
Now reads: "LIDAR sensor frames"; should read -- LIDAR sensor data frames --

Claim 20, Column 16, Line 64:
Now reads: "LIDAR sensor frames"; should read -- LIDAR sensor data frames --